United States Patent
Qiu et al.

(10) Patent No.: US 7,957,307 B2
(45) Date of Patent: Jun. 7, 2011

(54) REDUCING EFFECTS OF PACKET LOSS IN VIDEO TRANSMISSIONS

(75) Inventors: Jingyu Qiu, Issaquah, WA (US);
Timothy M. Moore, Bellevue, WA (US);
Guo-Wei Shieh, Sammamish, WA (US);
Zong Zong Yuan, Bellevue, WA (US);
Regis Crinon, Camas, WA (US); Arvind Jayasundar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 447 days.

(21) Appl. No.: 11/686,198

(22) Filed: Mar. 14, 2007

(65) Prior Publication Data

US 2008/0225735 A1    Sep. 18, 2008

(51) Int. Cl.
*H04L 12/26* (2006.01)
*H04L 1/18* (2006.01)
*H03M 13/00* (2006.01)

(52) U.S. Cl. ......... 370/252; 370/254; 714/751; 714/756

(58) Field of Classification Search ........................ None
See application file for complete search history.

(56) References Cited

U.S. PATENT DOCUMENTS

| | | | |
|---|---|---|---|
| 5,159,452 A | | 10/1992 | Kinoshita et al. |
| 5,602,831 A | * | 2/1997 | Gaskill ................ 370/252 |
| 5,608,450 A | | 3/1997 | Agarwal et al. |
| 6,421,387 B1 | | 7/2002 | Rhee |
| 6,434,191 B1 | * | 8/2002 | Agrawal et al. ........... 375/227 |
| 6,754,181 B1 | * | 6/2004 | Elliott et al. ............... 370/252 |
| 6,754,843 B1 | | 6/2004 | Lu et al. |
| 6,782,490 B2 | * | 8/2004 | Maxemchuk et al. ........ 714/18 |
| 6,816,194 B2 | | 11/2004 | Zhang et al. |
| 6,901,069 B2 | | 5/2005 | Bastin |
| 6,970,430 B2 | | 11/2005 | Guven et al. |
| 6,971,057 B1 | * | 11/2005 | Delvaux et al. ............ 714/788 |
| 7,103,669 B2 | | 9/2006 | Apostolopoulos |
| 7,116,641 B2 | * | 10/2006 | Lim ........................... 370/254 |
| 7,151,749 B2 | * | 12/2006 | Vega-Garcia et al. ....... 370/241.1 |
| 7,539,187 B2 | * | 5/2009 | Fellman et al. ............ 370/389 |
| 7,554,922 B2 | * | 6/2009 | Vega-Garcia et al. ........ 370/241 |

(Continued)

FOREIGN PATENT DOCUMENTS

EP    1 555 788    7/2005

OTHER PUBLICATIONS

Pei, Yong and Modestino, James W., "Interactive Video Coding and Transmission over Heterogeneous Wired-to-Wireless IP Networks Using an Edge Proxy," EURASIP Journal on Applied Signal Processing 2004, Copyright 2004 Hundawi Publishing Corporation (12 pages).

(Continued)

*Primary Examiner* — Gregory B Sefcheck
(74) *Attorney, Agent, or Firm* — Perkins Coie LLP

(57) ABSTRACT

An error correction system determines a level of error correction protection to apply to a frame of video data to be transmitted by a sending endpoint to a receiving endpoint based on the predicted impact of packet loss as well as the importance of the frame based on inter-frame dependencies, frame size, packet loss probability, historical packet loss pattern, central processing unit (CPU) load, and available network bandwidth. At the receiving endpoint, when packet loss is detected for a particular frame, the receiving endpoint will attempt to recover the frame using protection packets received along with the video data.

25 Claims, 6 Drawing Sheets

U.S. PATENT DOCUMENTS

| | | |
|---|---|---|
| 2003/0039312 A1 | 2/2003 | Horowitz et al. |
| 2003/0063569 A1* | 4/2003 | Kalliokulju et al. .......... 370/252 |
| 2003/0103465 A1* | 6/2003 | Counterman ................. 370/252 |
| 2004/0132442 A1 | 7/2004 | Zimmermann et al. |
| 2004/0168110 A1 | 8/2004 | Fuldseth et al. |
| 2005/0172199 A1* | 8/2005 | Miller et al. .................. 714/749 |
| 2006/0146757 A1* | 7/2006 | Harris .......................... 370/335 |
| 2006/0150053 A1* | 7/2006 | van der Schaar et al. ..... 714/752 |
| 2006/0291475 A1* | 12/2006 | Cohen ...................... 370/395.42 |
| 2007/0033494 A1* | 2/2007 | Wenger et al. ................ 714/776 |
| 2007/0053445 A1* | 3/2007 | Schaar et al. ............ 375/240.28 |
| 2007/0058565 A1* | 3/2007 | Wiatrowski et al. .......... 370/252 |
| 2007/0150784 A1* | 6/2007 | Pan et al. ...................... 714/746 |
| 2008/0316362 A1* | 12/2008 | Qiu et al. ...................... 348/607 |
| 2009/0319846 A1* | 12/2009 | Ma et al. ....................... 714/747 |

OTHER PUBLICATIONS

Shin, Jitae et al., "Content-Based Packet Video Forwarding Mechanism in Differentiated Service Networks," 2000 (10 pages).

* cited by examiner

REDUCING EFFECTS OF PACKET LOSS IN VIDEO TRANSMISSIONS

BACKGROUND

Computer networks, such as the Internet, have revolutionized the way in which people obtain information. For example, modern computer networks support the use of e-mail communications for transmitting information between people who have access to the computer network. Increasingly, systems are being developed to enable the exchange of data over a network that has a real-time component. For example, a video stream may be transmitted between computers connected by a network such that network conditions may affect how the information is presented to the user. Data is generally transmitted over a computer network in packets. Unfortunately, packet loss occurs when one or more packets being transmitted over the computer network fail to reach their destination. A number of factors may cause packet loss: an over utilized network, signal degradation, faulty hardware, and so on. When packet loss occurs, performance issues may become noticeable to the user. For example, in the context of a video stream, packet loss may result in "artifacts" or distortions that are visible in a sequence of video frames.

Network packet loss is common. It happens on the public Internet, DSL, Cable, wireless local area network (WLAN), 3G wireless, and many other kinds of networks. The estimated packet loss rate on the Internet is 5%, and some wireless networks may have packet loss of over 10%. Reliable network transmission protocols, such as Transmission Control Protocol (TCP), will resend a packet if the transmission medium drops the packet, thus guaranteeing packet delivery. Unreliable protocols, such as User Datagram Protocol (UDP), do not guarantee packet delivery and do not resend dropped packets. Resending packets takes time and consumes additional bandwidth. Due to the real-time nature of video communication, video signals are often sent using unreliable protocols and therefore will suffer from network packet loss.

For real-time video communication, a sending endpoint sends video frames across a network to a receiving endpoint, sometimes at a rate of 20 to 30 frames per second or more. Frames are divided into packets based on the Maximum Transmission Unit (MTU) allowed by the network (e.g., 1500 bytes for Ethernet). A frame of video may be small enough to fit within one packet, or may be large enough to require many packets. For some video compressor/decompressors (codecs), if any of the packets in a frame is dropped, then the receiving endpoint must discard the whole frame due to missing data.

In addition, codecs often use a dependency structure to reduce the amount of video data that a sending endpoint transmits over the network. For example, a frame called an intra (I) frame is encoded in full based on its contents. Subsequent frames are compressed based on a delta (difference signal) from the previous frames. These frames are often called prediction (P) frames. Some codecs introduce even more complex dependency structures. For example, the codec may occasionally send special P-frames called super-prediction (SP-frames) that, as opposed to regular P-frames, do not depend on the immediately preceding P-frame or I-frame but rather on an older SP-frame or I-frame. The contents of such SP-frames typically are less correlated with the reference frame and thus carry more video data. Another type of frame is a between or bi-directional (B) frame that contains a delta from both a previous and a subsequent frame. These types of inter-frame dependencies reduce the amount of data that the sending endpoint transmits over the network, but the dependencies also exaggerate the effects of network packet loss. For example, if an I-frame is dropped, the receiving endpoint will be missing data for all subsequent P-frames that depend on the I-frame, and the user will see video artifacts until the next I-frame arrives. If network packet loss is 1%, a 10 packet I-frame has a 10% chance of getting dropped according to the following formula:

$$P_I = 1 - (1-P)^N$$

Where $P_I$ is the probability of losing an I-frame, P is the probability of losing any packet, and N is the number of packets in the frame. If an I-frame has a 10% chance of being dropped, then subsequent frames that depend on the I-frame have a 10% chance of having video artifacts, even if all of the subsequent frames arrive at the receiving endpoint correctly.

One traditional method of reducing the effects of packet loss is forward error correction (FEC). Forward error correction (FEC) is a system of error control for data transmission, whereby the sending endpoint adds redundant data to its messages that allows the receiving endpoint to detect and correct errors (within some bound) without the need to ask the sending endpoint for additional data. The advantage of forward error correction is that retransmission of data can often be avoided (at the cost of higher bandwidth requirements on average) and is therefore applied in situations where retransmissions are relatively costly or impossible, such as when transmitting real-time video data. Different FEC algorithms have different bandwidth requirements and provide different levels of protection against lost packets, so different forward FEC algorithms are suitable for different conditions.

Unfortunately, it is difficult for the sending endpoint to determine which FEC algorithm will provide the best video experience for a particular network connection. The sending endpoint also often has bandwidth and computational resource limitations that make efficient choice of FEC algorithms advantageous. In addition, many sending endpoints are responsible for sending video data to many different receiving endpoints simultaneously, such that determinations that are performed for each endpoint can become very costly in terms of resources available at the sending endpoint.

SUMMARY

A method and system for reducing the effects of packet loss on video transmissions is provided, referred to as the error correction system. The error correction system determines a level of error correction protection to apply to a frame of video data to be transmitted by a sending endpoint to a receiving endpoint based on the predicted impact of packet loss as well as the importance of the frame based on inter-frame dependencies, frame size, packet loss probability, historical packet loss pattern, central processing unit (CPU) load, and available network bandwidth. The error correction system uses the determined level of protection to produce protection packets. The sending endpoint transmits the protection packets to the receiving endpoint along with the packets containing the video frame. At the receiving endpoint, when packet loss is detected for a particular frame, the receiving endpoint will attempt to recover the frame using any protection packets received based on the protection-encoding scheme used by a given protection packet.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
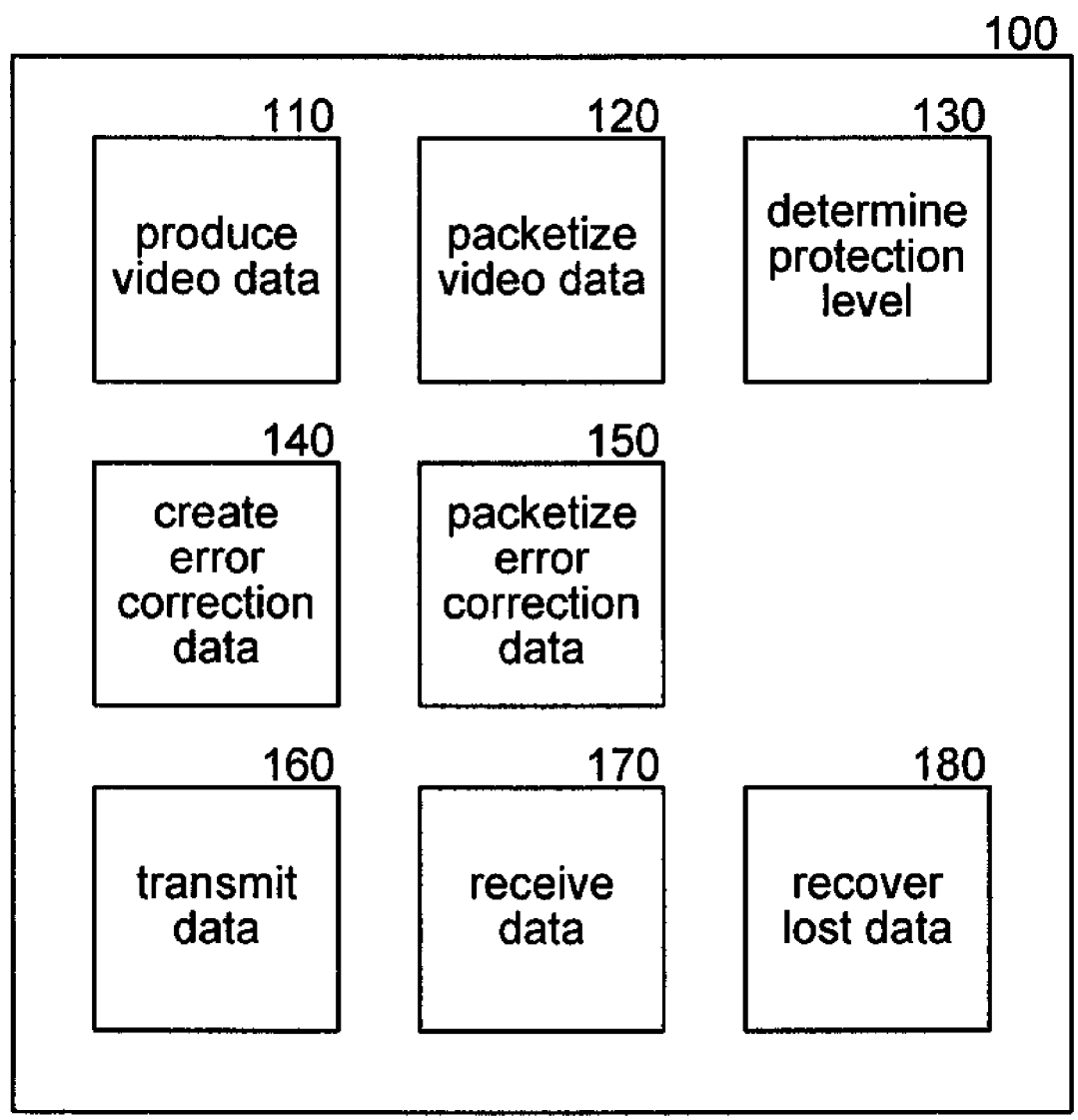
FIG. 1 is a block diagram that illustrates components of the error correction system in one embodiment.

A method and system for reducing the effects of packet loss on video transmissions is provided, referred to as the error correction system. The error correction system determines a level of error correction protection to apply to a frame of video data to be transmitted by a sending endpoint to a receiving endpoint based on the predicted impact of packet loss as well as the importance of the frame based on inter-frame dependencies, frame size, packet loss probability, historical packet loss pattern, central processing unit (CPU) load, and available network bandwidth. The sending endpoint can apply a level of protection to a frame ranging from zero (no protection) to N (any number larger than zero) where each subsequent number involves a higher level of protection. Typically, each subsequent level of protection includes larger recovery data and consumes additional computational resources to create the recovery data. A mathematical model for predicting the impact of packet loss on video quality was described in U.S. application Ser. No. 11/591,297, entitled "Dynamic Modification of Video Properties," filed on Oct. 31, 2006, which is hereby incorporated herein by reference. Using this and other mathematical models, the error correction system can determine the level of protection that will provide a target level of packet loss.

The error correction system passes the selected level of protection to a channel protection codec, such as the Turbo codec or Reed-Solomon codec, to produce protection packets of the selected level. The sending endpoint transmits the protection packets to the receiving endpoint along with the packets containing the video frame. For example, the sending endpoint may append the protection packets after the video frame packets or may send the protection packets on a different connection as a separate payload. At the receiving endpoint, when packet loss is detected for a particular frame, the receiving endpoint will attempt to recover the frame using any protection packets received based on the protection-encoding scheme used by a given protection packet. Thus, the error correction system provides an efficient way of selecting an appropriate level of protection based on characteristics of the connection between the sending endpoint and receiving endpoint.

The error correction system produces an increase in the efficiency of received packets. For example, in prior systems a server might send data at a rate of 300 kbps, but because of the number of lost I-frames, the actual receive rate perceived by the user might only be equivalent to a 128 kbps video rate. Using the error correction system, more I-frames that are lost or arrive corrupted are recovered by the receiving endpoint. Therefore, a server sending at a rate of 300 kbps may produce a received rate of 270 kbps or even higher (since there may still be some packet loss of less significant frames). Accordingly, the efficiency using the error correction system is much greater. This results in bandwidth cost savings for the sending endpoint, CPU savings, and an improved experience for the user of the receiving endpoint.

The following description sets forth packet loss reduction techniques applicable between a single sending endpoint and receiving endpoint. Then, these and other techniques are described in the context of a video conferencing server in which a single sending endpoint provides data for sending to many receiving endpoints. Finally, packet formats for performing these techniques are described.

Single Link Techniques

As described above, there are several possible levels of protection ranging from zero (no protection) to N (any number larger than zero) where each subsequent number involves a higher level of protection. Those of ordinary skill in the art will recognize that the error correction system can apply many different types of error correction to produce a particular level of protection, such as an exclusive-OR (XOR) logical operation, the Reed-Solomon algorithm, the Viterbi algorithm, and so on. Each level of protection is slightly more costly in both size and computational intensity to compute the protection data. It is therefore desirable to pick the optimal level of protection for any particular set of conditions. The required level of protection may be determined based on the size of the frame and the historical percentage of packet loss. Larger frame sizes have a higher probability that at least one packet carrying data for the frame will be lost, and therefore require a higher level of protection. Similarly, as the level of historical packet loss increases, a higher level of protection is required to provide the receiving endpoint with enough information to recover the lost packets.

In some embodiments, the receiving endpoint provides an indication of historical packet loss to the sending endpoint. Video data is generally sent over an unreliable link that does not acknowledge packets. However, there is usually a back channel through which the receiving endpoint periodically (e.g., every five seconds) communicates with the sending endpoint to indicate historical packet loss. One way of determining packet loss is by assigning a sequence number to each packet sent by the sending endpoint. The receiving endpoint then determines the packet loss by counting how many sequence numbers did not arrive.

In some embodiments, the error correction system attempts to split a frame into evenly sized packets. For some error correction algorithms, protection packets must be as large as the largest packet of the video frame. Therefore, by distributing the frame data evenly across the packets, the error correction system reduces the size of the protection packets. Error correction packets may follow the video data and have a quantity based on the level of protection. For example, if the error correction system applies a protection level one, then one error correction packet will follow the video data. If the error correction system applies a protection level two, then two packets will follow the video data, and so on. Reducing the size of the protection packets also saves bandwidth.

In some embodiments, if the last packet of the video frame would be shorter than the other packets, then the error correction system adds padding to the last packet to cause it to have a size similar to the other packets of the video frame. For example, a 10,000-byte frame may be split into seven 1,500-byte packets, where the last packet is only 1,000 bytes. The error correction will add 500 bytes of padding to the last packet to make it the same size as each of the other packets. In some embodiments, to save bandwidth the error correction system does not transmit the padding from the sending endpoint to the receiving endpoint. Rather, the receiving endpoint adds the padding based on the size of the preceding packets or based on information in a header of the last packet. For example, if the receiving endpoint receives a 1,000-byte packet with a header that indicates that the total packet size should be 1,500 bytes, the receiving endpoint will add 500 bytes of padding. Padding bytes may contain a pre-selected value such as zero.

In some embodiments, the error correction system pre-calculates protection data sent in protection packets. Performing error correction calculations can be expensive, and pre-calculating offsets expensive processing to a time when the endpoint is less busy. For example, for any given frame size and level of packet loss an endpoint can calculate an appropriate level of protection to use before the sending endpoint even connects to a receiving endpoint. The sending endpoint can construct a table from this information that contains a mapping between levels of protection and expected levels of packet loss and frame sizes. Then, during transmission, the sending endpoint can look up the appropriate level of protection to use based on a particular frame size and historical level of packet loss. In essence, the level error protection becomes adaptive and time varying.

In some embodiments, the error correction system applies protection primarily to I-frames and SP-frames. As described above, a sending endpoint may send video data using a dependency structure such that many other frames (e.g., P- and B-frames) depend on I- and SP-frames. If a P-frame is lost, then there is perhaps only a few milliseconds gap (e.g., 33 ms if the frame rate is 30 frames/sec or 66 ms if the frame rate is 15 frames/sec) in the video, whereas if an I-frame is lost, potentially a second or more of video could be lost. Even though some of the P- and B-frames will arrive, there will not be enough information without the missing I-frame to maintain a consistent video stream during that period. Experiments have shown that users will perceive one big loss worse than routine small loss. Therefore, losing an I- or SP-frame will have a more noticeable effect on the quality of video displayed at the receiving endpoint. I- and SP-frames are also much more likely to get lost due to their larger size and corresponding increased number of packets required to transmit them from the sending endpoint to the receiving endpoint. Accordingly, the error correction system may provide increased protection to I- and SP-frames.

In some embodiments, the error correction system does not add protection packets based on characteristics of the video data. For example, if the frame size is too small or the desired bit rate is too low, the overhead of adding protection packets may be too high. In fact, for small frame sizes the increased packet count caused by adding protection may make packet loss more likely. Similarly, if the desired bitrate is too low (e.g., 50 kbps), then the overhead of adding protection packets to the data stream may be large enough (e.g., 8 kbps) to make other methods of protection (such as retransmitting packets) more worthwhile.

Conferencing

Video conferencing servers often receive video data from a sending endpoint for broadcast to many receiving endpoints. For example, a presenting user may give a presentation that a video conferencing server forwards to many receiving endpoints, where each endpoint represents a participant in the conference. In this environment, packet loss may occur between the sending endpoint and the video conferencing server, and between the video conferencing server and any receiving endpoint. To scale well, the video conferencing server is often designed to reduce the computational overhead for each endpoint. Even a small amount of computational overhead that the video conferencing server expends for each endpoint may become a significant burden when the server is sending data to thousands of receiving endpoints. Additional techniques for handling packet loss in this environment and for optimizing the processing performed by the video conferencing server are described below.

In some embodiments, the error correction system does not determine the level of protection to use separately for every downlink. Instead, an initial calculation may be performed for each downlink, and the worst downlink may be chosen to select the level of error correction that would be used for all downlinks. Alternatively, downlinks may be categorized in the buckets of which downlinks need level one protection, which downlinks need level two protection, and so on. The error correction packets are then only formed once, and then the correct number of packets is added for each downlink. For example, if a particular downlink has protection level one, then only the first error correction packet will be added to that downlink. Another possible optimization is that the sender could be informed of the worst-case downlink. In this example, if the worst downlink needs protection level three, then the sender will be responsible for sending three error correction packets with each video frame. The video conference server can then forward as many error correction packets along as each downlink requires. By doing this, the computation of error correction packets is offloaded to the sender and the video conference server can remove the error protection packets from the bit stream if it determines that a lower level of protection is acceptable for a particular downlink.

In some embodiments, the sending endpoint applies protection in stages. Using staged levels of protection, the sending endpoint sends a first protection packet having a first protection level, and one or more additional protection packets at higher protection levels. When packet loss occurs, the receiving endpoint may choose the protection packet to use based on the degree of packet loss and the required level of protection to recover the lost packets. Staging reduces the processing performed by the video conferencing server by creating protection packets once and applying the protection packets as needed to many receiving endpoints. For example, the receiving endpoint may send one protection packet to receiving endpoints having a low rate of packet loss, and the same protection packet plus additional protection packets to receiving endpoints having a high rate of packet loss. The receiving endpoints having the high rate of packet loss can then use the additional protection packets to perform more extensive error recovery.

In some embodiments, the video conferencing server sends a packet loss report to the sending endpoint that indicates the packet loss of the worst case receiving endpoint. Based on the packet loss report, the sender protects frames at a level of protection and including a number of protection packets based on the worst case receiving endpoint. Upon receiving the video data, the video conferencing server may not forward all protection packets to all receiving endpoints, based on information about the historical packet loss experienced by each receiving endpoint. For example, one receiving endpoint may require a single protection packet while another receiving endpoint may require two protection packets to achieve a target level of effective packet loss. The sending endpoint may provide two protection packets, and the video conferencing server may only send the first protection packet to one of the endpoints while sending both protection packets to the other endpoint. This provides both endpoints with the level of protection that they need, while reducing the bandwidth and computational overhead consumed by the video conferencing server.

In some embodiments, the video conferencing server shares the burden of producing protection packets with the sender. For example, the sender may provide protection packets at a first level, and the video conferencing server may be responsible for adding additional levels of protection for those receiving endpoints that require additional protection (e.g., based on historical packet loss). Those of ordinary skill in the art will recognize that many different ways are available for sharing the computational overhead between the sending endpoint and the video conferencing server.

In some embodiments, the error correction system dynamically determines the level of protection to use for a particular receiving endpoint on a periodic basis. For example, the video conferencing server may receive a periodic (e.g., every five seconds) report of packet loss from each receiving endpoint, and based on the report the video conferencing server may select the level of protection to apply to the transmitted data. The conditions of a particular connection may change over time or the type of data being sent (e.g., the frame size) may change such that a different level of protection is more effective.

Packet Format

The following description describes one packet format for implementing the error correction techniques described herein. A typical packet contains a format adaptation header and a payload. The header contains information describing the payload of the packet and describing how the packet relates to other packets sent over the network. The header may contain a series of flags that specify the characteristics of the packet. The payload contains video data for a video frame, and error correction data for a protection frame.

| F | H | K | O | L | S | C | M = 1 |
|---|---|---|---|---|---|---|---|
| | | | Video Frame: | | | | |
| V = 1 | Version = 00 | | H-FC<br>Frame Count<br>Referral Frame # | | H-RF | | M = 0 |
| | | | Protection Frame: | | | | |
| P = 1 | Version = 00 | | H-FC<br>Frame Count<br>Referral Frame # | | H-RF | | M = 1 |
| | Unused | | | | H-Pkt# | | M = 0 |
| | | | L-Pkt# | | | | |
| | End Offset | | | | H-LPktSize | | |
| | | | L-LPktSize | | | | |

Flags:

| F | FirstPacket |
|---|---|
| H | Sequence Header exists |
| K | Key frame |
| O | Fixed to One |
| L | Marker Bit for last pkt |
| S | SP-frame |
| C | cached frame |
| M | Mode |
| P | Payload type: 1 = metadata, 0 = video |
| Ver | Payload header version |
| H-FC | High bit frame count |
| H-RF | High Bit reference count |
| M | Extension mode |

-continued

| FC | Frame count |
|---|---|
| RFC | Reference frame count |
| H-Pkt# | High bit frame size in # pkts |
| L-Pkt# | Low bit frame size in # pkts |
| Offset | Offset of last content pkt to current FEC pkt |
| H-LpktSize | Last frame pkt size in Bytes |
| L-LpktSize | Last frame pkt size in Bytes |

In this example packet format, a flag V specifies whether the packet contains video data or protection data (e.g., FEC). For a video packet, P=0, and for a protection packet P=1. The packet contains flags indicating whether the packet is the first (F=1) or last (L=1) packet carrying data for a particular frame. The packet also contains members indicating the size of the last packet (e.g., H-LpktSize and L-LpktSize) that can be used by the receiving endpoint to add appropriate padding as described above. The packet also contains members (e.g., H-Pkt# and L-Pkt#) that act as a sequence number that the receiving endpoint can use to determine if any packets are missing. The Referral Frame # member identifies the frame that the current encoded frame depends on for decoding, such as a P-frame that refers to an I-frame. The packet also contains a member, Offset, for protection packets that indicates which protection packet the current packet is in a series of multiple protection packets. This member is used because protection packets can be lost, too, and if a protection packet arrives with an offset of two (indicating that the last content packet was two packets previous), then the receiving endpoint can determine that the first protection packet was lost. In some embodiments, the version information is used to allow legacy clients to interoperate with newer versions of a sending endpoint or videoconferencing server.

FIGURES

The following description illustrates details of the embodiments described with reference to the figures.

FIG. 1 is a block diagram that illustrates components of the error correction system in one embodiment. The error correction system 100 includes a produce video data component 110, a packetize video data component 120, a determine protection level component 130, a create error correction data component 140, a packetize error correction data component 150, a transmit data component 160, a receive data component 170, and a recover lost data component 180. The produce video data component 110 produces video data, such as by capturing a digital signal from a video input device (e.g., a webcam) or playing back a file containing video data. The packetize video data component 120 divides the video data into packets suitable for transmission over a network. As described above the packets may contain header information that describes the data being transmitted and used by the receiver to make various determinations about the received data. The determine protection level component 130 determines the appropriate level of protection to apply to the video data based on factors such as the video data frame size and an indication of historical packet loss received from the receiving endpoint.

The create error correction data component 140 creates error correction data based on the determined protection level and the video data. The packetize error correction data component 150 divides the error correction data into packets suitable for transmission over the network. The error correction system may divide the resulting error correction packets based on the error correction algorithm used to produce the error correction data. The error correction system may use more than one error correction algorithm to produce error correction data packets that apply varying levels of error correction. The transmit data component 160 transmits the video data packets and error correction packets from the sending endpoint to the receiving endpoint. The receive data component 170 receives data from the sending endpoint and determines whether any packets were lost. If packets were lost, the recover lost data component 180 uses any received error correction packets to recover any lost video data packets.

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, set-top boxes, IP webcams, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2A:
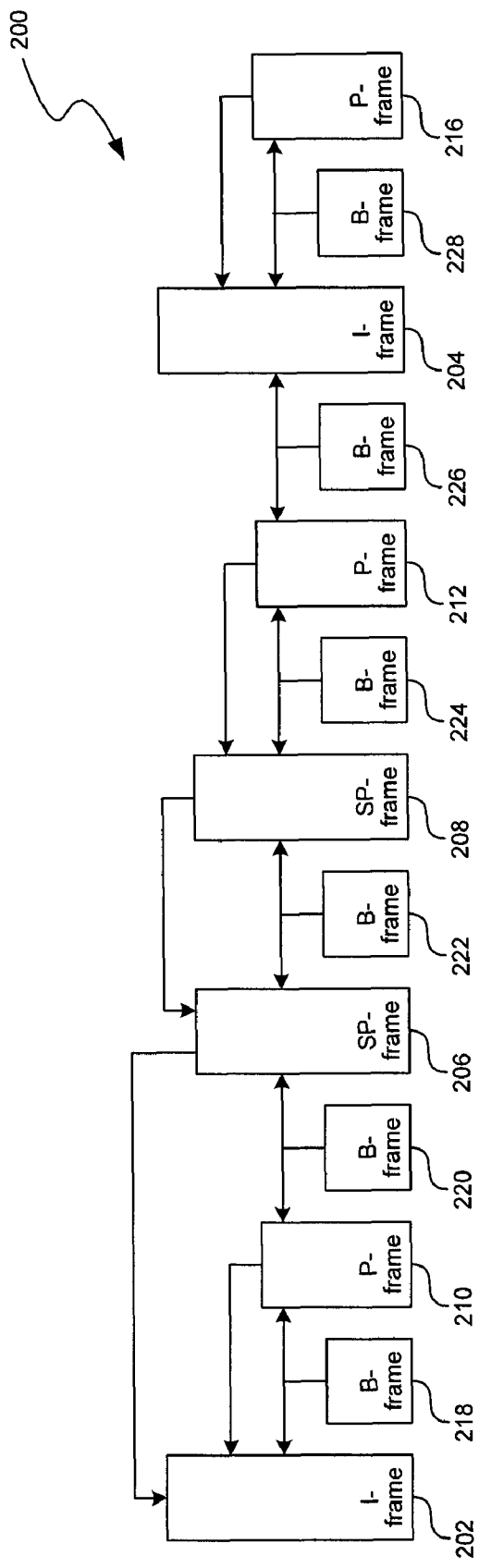
FIGS. 2A and 2B illustrate an exemplary sequence of frames in a video stream in one embodiment.
Figure 2B:
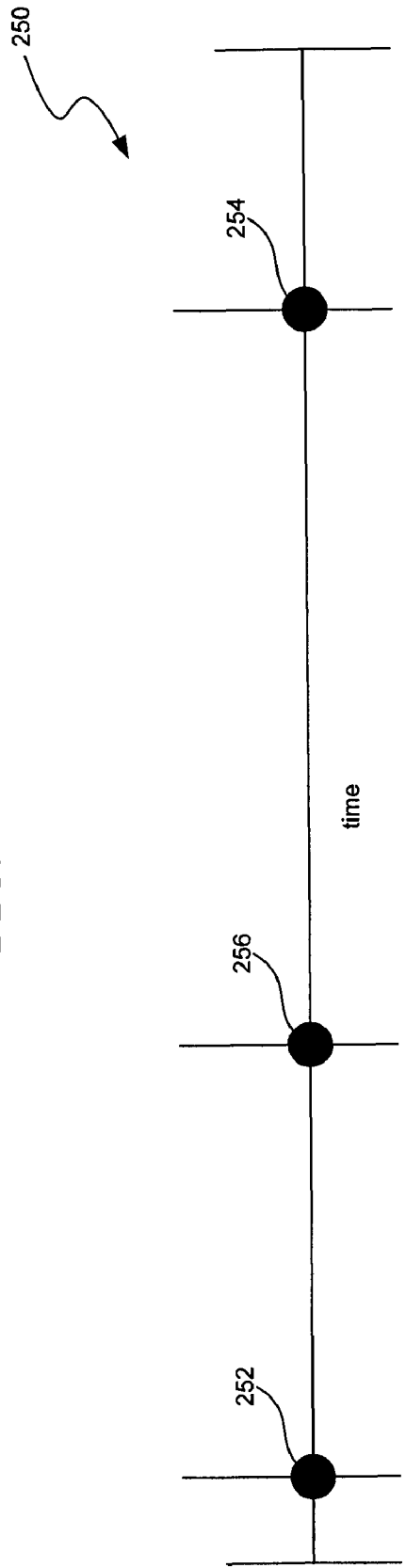

FIGS. 2A and 2B illustrate an exemplary sequence of frames in a video stream in one embodiment. An encoder may be used to compress frames in a video stream in a way that reduces the redundancy of image data. FIG. 2A illustrates a sequence of frames 200 that consists of the I-frames 202-204, SP-frames 206-208, P-frames 210-216, and B-frames 218-228. The I-frames 202-204 are standalone in that I-frames are encoded without reference to previous or subsequent frames and once decoded may be used to present a complete image. As illustrated in FIG. 2A, the I-frames 202-204 serve as predictive references, either directly or indirectly, for the SP-frames 206-208, P-frames 210-216, and B-frames 218-228. The SP-frames 206-208 are predictive in that the frames are encoded with reference to the nearest previous I-frame or other SP-frame. Similarly, the P-frames 210-216 are also predictive in that these frames reference an earlier frame which may be the nearest previous I-frame or SP-frame. As further illustrated in FIG. 2A, the B-frames 218-228 are encoded using a technique known as bidirectional prediction in that image data is encoded with reference to both a previous and subsequent frame.

The amount of data in each frame is visually depicted in FIG. 2A with I-frames 202-204 containing the largest amount of data and SP-frames 206-208, P-frames 210-216, and B-frames 218-228 each providing successively larger amounts of compression. As used herein, the term "compression mode" refers to the state of an encoder when a particular frame type (e.g. I-frame, SP-frame, P-frame, B-frame, etc.) is encoded for transmission over a network connection. Those skilled in the art in others will recognize that an encoder may be configured to support different compression modes for creating different frame types. While encoding the sequence of frames 200 into various frame types reduces the amount of data that is transmitted, compression of image data may perpetuate errors. The I-frame 202 may be transmitted between communicatively connected computers in a set of packets. However, if any of the packets in the I-frame 202 are lost in transit, the I-frame 202 is not the only frame affected by the error. Instead, the error may persist to other frames that directly or indirectly reference the I-frame 202. For example, as depicted in the timeline 250 of FIG. 2B, when the I-frame 202 experiences an error, at event 252, the error persists until event 254 when the subsequent I-frame 204 is received. In this instance, frames received between events 252 and 254 experience a degradation in quality, typically in the form of a video artifact, because the frames are typically decoded using the last I-frame that was received correctly by the endpoint.

Similar to the description provided above, when a packet associated with an SP-frame is lost, the error may persist to other frames. For example, as depicted in the timeline 250, when the SP-frame 206 experiences packet loss, at event 256, the error persists until event 254 when the next I-frame 204 is received. Since fewer dependencies exist with regard to SP-frames than I-frames, the impact of packet loss is also less. When a P-frame experiences packet loss, only the B-frames and other P-frames that reference the P-frame that experienced packet loss are impacted by the error. Finally, errors in B-frames do not persist since B-frames are not referenced by other frame types. This observation motivates the fact that, in some embodiments, error correction data may be added selectively and, in particular, may be confined to reference video frames (e.g., only I-frames or I- and SP-frames may be protected).

Figure 3:
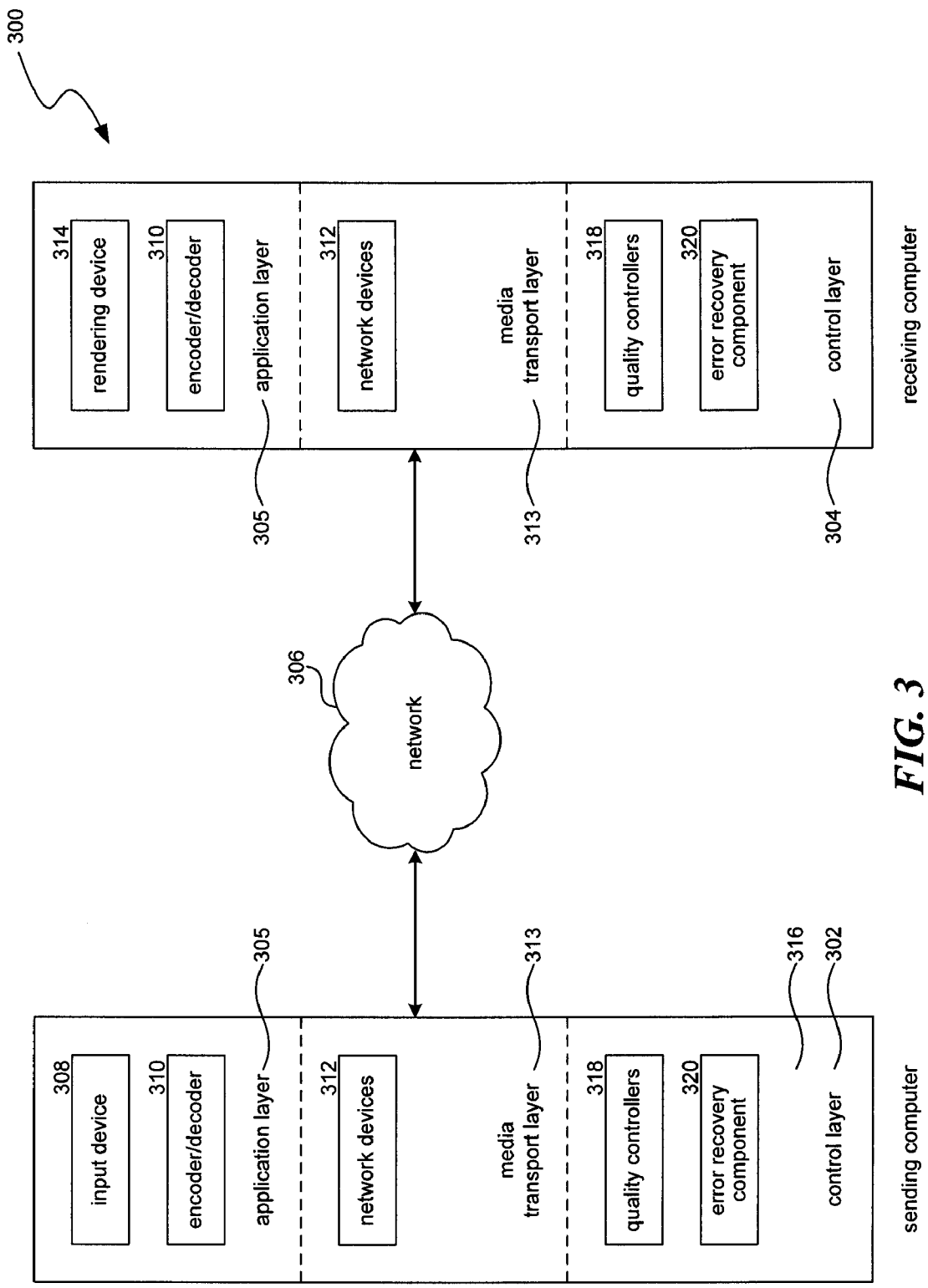
FIG. 3 illustrates a typical networking environment in which a sending endpoint transmits video data to a receiving endpoint, in one embodiment.

FIG. 3 illustrates a typical networking environment in which a sending endpoint transmits video data to a receiving endpoint, in one embodiment. The networking environment 300 includes a sending computer 302 and a receiving computer 304 that are communicatively connected in a peer-to-peer network connection. In this regard, the sending computer 302 and the receiving computer 304 communicate data over the network 306. As described previously, the sending computer 302 may be a network endpoint that is associated with a user. Alternatively, the sending computer 302 may serve as a node in the networking environment 300 by relaying a video stream to the receiving computer 304. Those skilled in the art and others will recognize that the network 306 may be implemented as a local area network ("LAN"), wide area network ("WAN") such as the global network commonly known as the Internet or World Wide Web ("WWW"), cellular network, IEEE 802.11, Bluetooth wireless networks, and the like.

In the embodiment illustrated in FIG. 3, a video stream is input into the sending computer 302 from the application layer 305 using the input device 308. The input device 308 may be any device that is capable of capturing a stream of images including, but not limited to, a video camera, digital camera, cellular telephone, and the like. When the video stream is input into the sending computer 304, the encoder/decoder 310 is used to compress frames of the video stream. Those skilled in the art will recognize that the encoder/decoder 310 performs video compression in a way that reduces the redundancy of image data within a sequence of frames. Since the video bit stream typically includes a sequence of frames that differ from one another only incrementally, significant compression is realized by encoding at least some frames based on differences with other frames. As described above, frames in a video stream may be encoded as I-frames, P-frames, SP-frames, and B-frames although other frame types (e.g., unidirectional B-frames, and the like) may also be utilized. However, when errors cause packet loss or other video degradation, encoding a video stream into compressed frames may perpetuate errors, thereby resulting in video artifacts persisting over multiple frames.

Once the encoder/decoder 310 compresses the video stream by reducing redundancy of image data within a sequence of frames, the network devices 312 and associated media transport layer 313 components (not illustrated) transmit the video stream. Frames of video data may be packetized and transmitted in accordance with standards dictated by the real-time transport protocol ("RTP"). Those skilled in the art and others will recognize that RTP is one exemplary Internet standard protocol that may be used for the transport of real-time data. In any event, when the video stream is received, the encoder/decoder 310 on the receiving computer 304 causes the stream to be decoded and presented to a user on the rendering device 314. The rendering device 314 may be any device that is capable of presenting image data including, but not limited to, a computer display (e.g., CRT or LCD screen), a television, monitor, printer, and so forth.

The control layer 316 provides quality of service support for applications with real-time properties such as applications that support the transmission of a video stream. The quality controllers 318 provide quality of service feedback by gathering statistics associated with a video stream including, but not limited to, packet loss rates, round trip times, and the like. By way of example only, the data gathered by the quality controllers 318 may be used by the error recovery component 320 to identify packets that will be used when error recovery is performed. Additional data may be periodically transmitted between endpoints that are exchanging a video stream for this purpose. The components of the control layer 316 may be used to modify properties of the video stream based on collected quality of service information.

Figure 4:
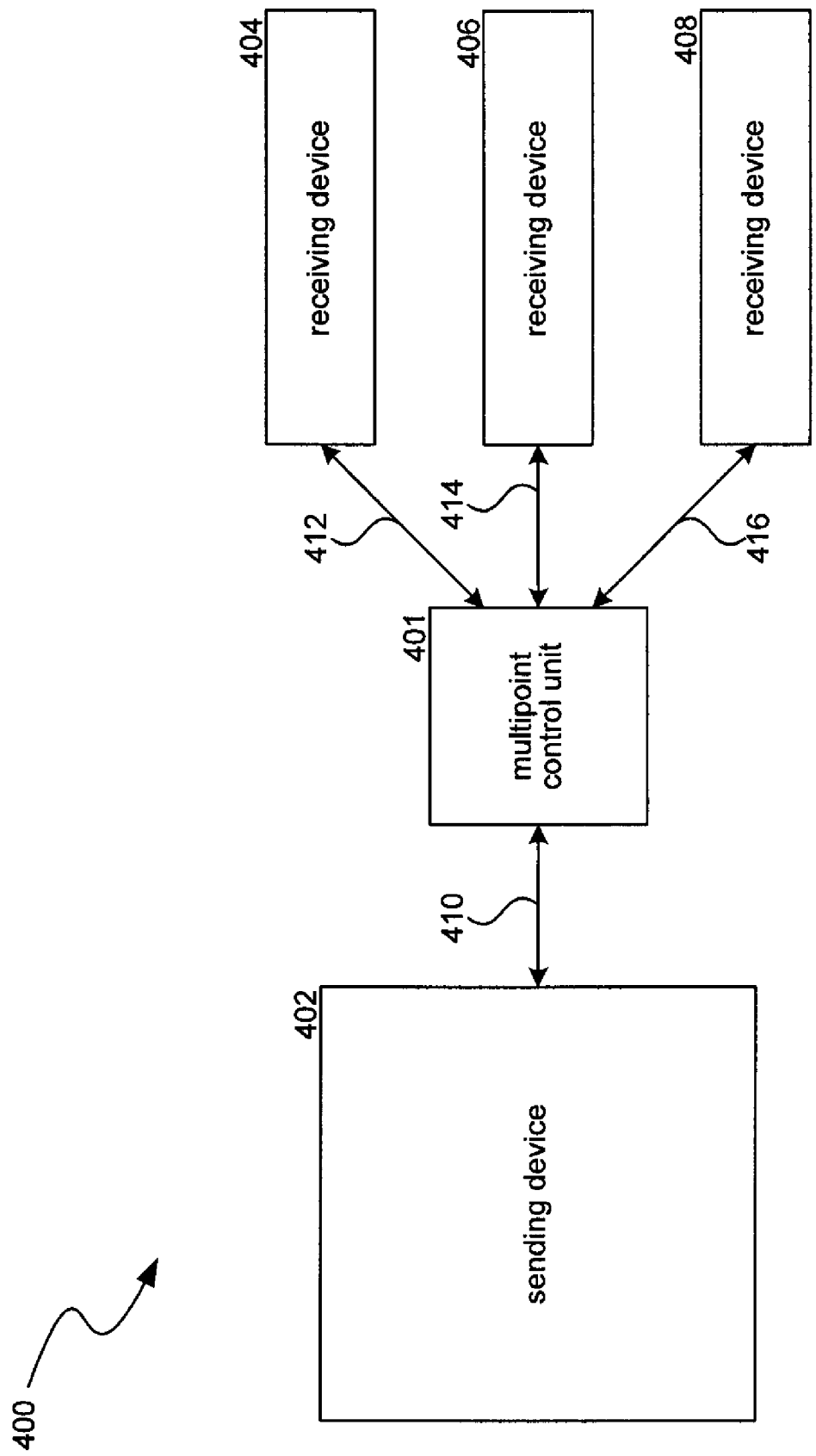
FIG. 4 illustrates a networking environment for sending video data to multiple receiving endpoints in one embodiment.

FIG. 4 illustrates a networking environment for sending video data to multiple receiving endpoints in one embodiment. The networking environment 400 includes a multi-point control unit 401 (e.g., a video conferencing server), a plurality of video conference endpoints including the sending device 402 and the receiving devices 404-408. Moreover, the networking environment 400 includes a peer-to-peer network connection 410 between the sending device 402 and the multi-point control unit 401 as well as a plurality of downstream network connections 412-416 between the multi-point control unit 401 and the receiving devices 404-408. Generally described, the multi-point control unit 401 collects information about the capabilities of devices that will participate in a video conference. Based on the information collected, properties of a video stream between the network endpoints may be established.

Figure 5:
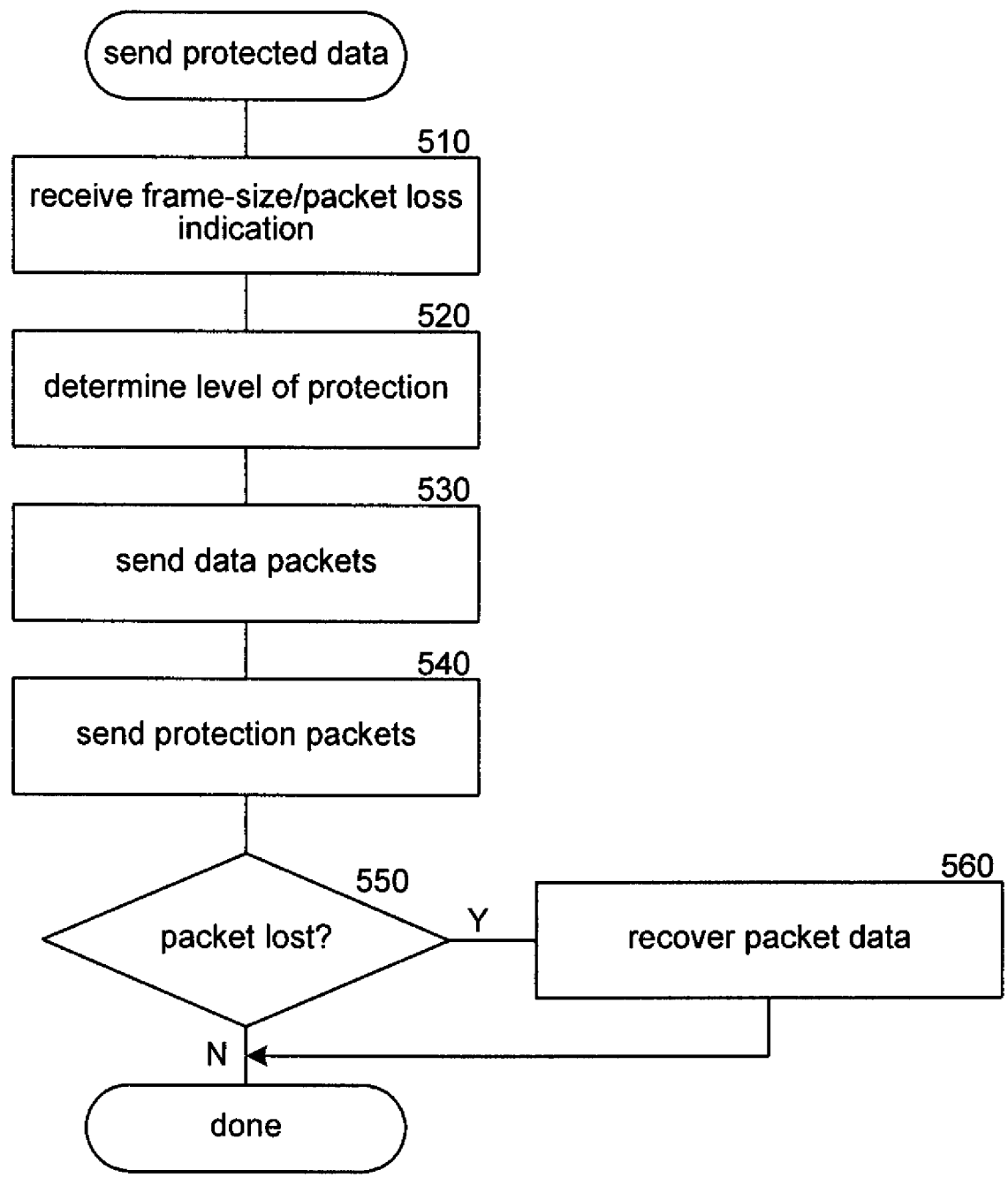
FIG. 5 is a flow diagram that illustrates the processing of the transmit data component of the system in one embodiment.

FIG. 5 is a flow diagram that illustrates the processing of the transmit data component of the system in one embodiment. In block 510, the component receives a frame size and indication of historical packet loss for the receiving endpoint. In block 520, the component determines an appropriate level of protection to apply based on the received frame size and indication of historical packet loss, and creates protection packets based on the determined protection level. In block 530, the component transmits the data packets to the receiving endpoint. In block 540, the component sends the created protection packets to the receiving endpoint. In decision block 550, the receive data component of the receiving endpoint determines if any data packets were lost. If a data packet was lost, then the component continues at block 560, else the component completes. In block 560, the component recovers the lost data packet using the redundant transmitted data, and then completes.

Figure 6:
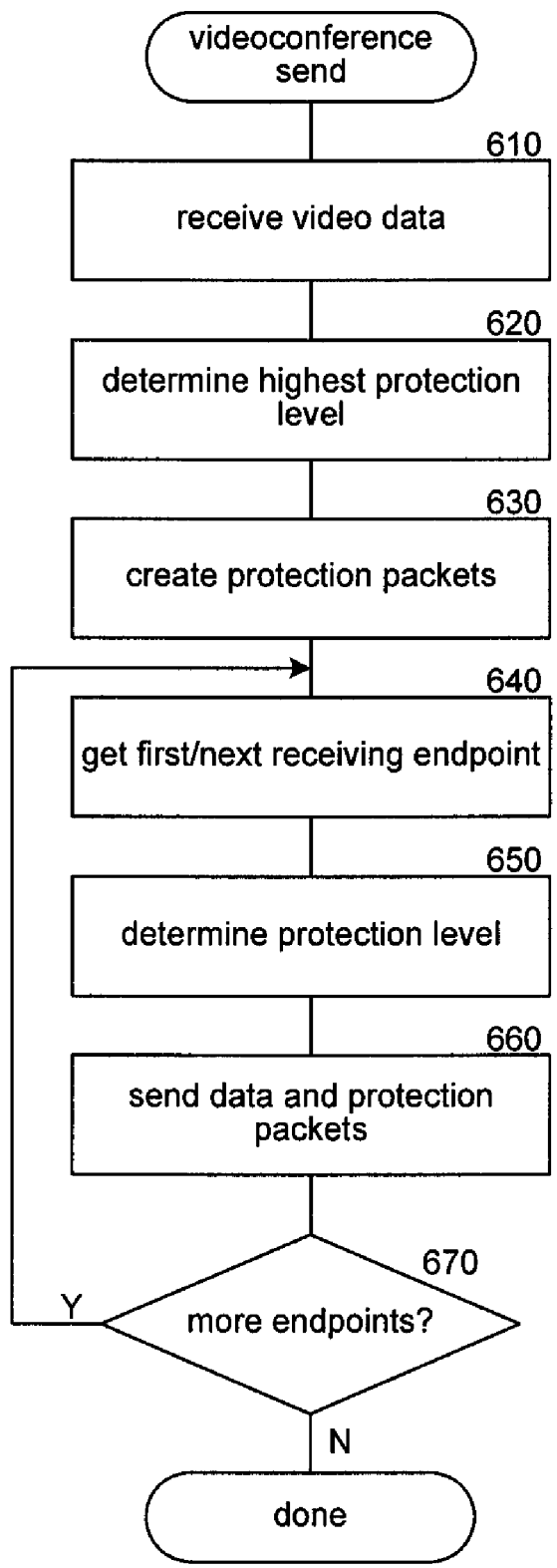
FIG. 6 is a flow diagram that illustrates the processing of the transmit data component of the system in a videoconferencing environment having multiple receiving endpoints in one embodiment.

FIG. 6 is a flow diagram that illustrates the processing of the transmit data component of the system in a videoconferencing environment having multiple receiving endpoints in one embodiment. In block 610, the component receives video data to be transmitted over the network. In block 620, the component determines the highest level of protection required to transmit the video data to each receiving endpoint such that each receiving endpoint can recover any lost video data. In block 630, the component creates protection packets to accompany the data based on the determined level of protection. In block 640, the component selects the first receiving endpoint. In block 650, the component determines the level of protection required to transmit the video data to the selected receiving endpoint such that the selected receiving endpoint can recover any lost video data. Based on the determination, the component includes one or more of the created protection packets when transmitting the video data. In block 660, the component transmits the video data and protection packets to the receiving endpoint. In decision block 670, if there are more receiving endpoints, then the component loops to block 640 to select the next receiving endpoint, else the component completes.

CONCLUSION

From the foregoing, it will be recognized that specific embodiments of the error correction system have been described herein for purposes of illustration, but that various modifications may be made without deviating from the spirit and scope of the invention. For example, although UDP has been described as one type of protocol with which the error correction system can be used, many other protocols can also be used such as the Real-Time Protocol (RTP) and Real-Time Control Protocol (RTCP). Accordingly, the invention is not limited except as by the appended claims.

We claim:

1. A method in a computing device for reducing the effects of packet loss when sending data between a sending endpoint and receiving endpoints, the sending endpoint being a video conferencing server and the receiving endpoints being devices of participants participating in a video conference, the data being video of the video conference, the method comprising:

for each of multiple receiving endpoints,
sending to the receiving endpoint first data packets of the video; and
receiving from the receiving endpoint an indication of a rate of packet loss experienced by the receiving endpoint while receiving the first data packets;
producing first protection packets and second protection packets for second data packets containing the data, the first protection packets providing a first level of protection and the second protection packets providing a second level of protection, the second level of protection being higher than the first level of protection; and
for each of multiple receiving endpoints,
determining by the computing device whether to apply the first level of protection or the second level of protection to the second data packets to be sent to the receiving endpoint based on the received indication of the rate of packet loss that was received from the receiving endpoint;

sending to the receiving endpoint second data packets containing the data of the video; and sending to the receiving endpoint the first protection packets and not the second protection packets when it is determined to apply the first level of protection and both the first protection packets and the second protection packets when it is determined to apply the second level of protection, the first protection packets and second protection packets comprising information with which the receiving endpoint can recover a lost data packet, such that when a second data packet is lost the receiving endpoint can recover the data of the lost second data packet using the sent first protection packets when the receiving endpoint is sent the first protection packets and not the second protection packet or selectively using the first protection packets or the second protection packets when the receiving endpoint is sent both the first protection packets and the second protection packets without additional communication with the sending endpoint and wherein the first protection packets and the second protection packets are not separately produced for each receiving endpoint and multiple receiving endpoints each receive the first protection packets and not the second protection packets and multiple receiving endpoints each receive both the first protection packets and the second protection packets.

2. The method of claim 1 wherein at least one level of protection applies an exclusive OR operation to the data.

3. The method of claim 1 wherein at least one level of protection applies the Reed-Solomon algorithm to the data.

4. The method of claim 1 including creating a table that maps levels of protection to frame size and rate of packet loss, and wherein determining a level of protection to apply comprises looking up the level of protection in the table based on frame size and rate of packet loss.

5. The method of claim 1 wherein receiving a rate of packet loss comprises receiving a packet loss report from the receiving endpoint.

6. The method of claim 1 wherein determining a level of protection to apply comprises determining a type of a video frame, and including applying a higher level of protection to a frame type on which other frames depend.

7. The method of claim 1 wherein determining a level of protection to apply comprises not applying protection to data having a size below a predetermined threshold or containing video data below a predetermined bitrate.

8. The method of claim 1 wherein the sending endpoint is a video conferencing server serving multiple receiving endpoints.

9. A computer system for reducing the effects of packet loss on videoconferencing data transmitted from a sending endpoint to a receiving endpoint through a videoconferencing server over a network, comprising:

a video conference data receiving component configured to receive video conference data from the sending endpoint;

an error correction component configured to produce error correction data based on the video conference data, wherein the error correction data provides information for recovering a lost portion of the video conference data and is divided into first packets and second packets, the first packets providing a first level of protection and the second packets providing a second level of protection that is higher than the first level of protection;

a video conference data sending component configured to forward the video conference data received from the sending endpoint to multiple receiving endpoints; and an error correction data sending component configured to, for each of multiple receiving endpoints:

determine whether to send the first packets and not the second packets or both the first packets and the second packets to the receiving endpoint based on characteristics of the video conference data and the connection with the receiving endpoint; and based on the determining, send to the receiving endpoint the determined packets, such that the error correction data is not separately produced for each receiving endpoint, multiple receiving endpoints are sent the first packets and not the second packets and use the first packets to perform error correction of the video conference data, and multiple receiving endpoints are sent both the first packets and the second packets and selectively use the first packets or the second packets to perform error correction of the video conference data.

10. The system of claim 9 wherein the error correction component receives the error correction data from the sending endpoint.

11. The system of claim 9 wherein the error correction component creates the error correction data at the videoconferencing server.

12. The system of claim 9 wherein the sending endpoint creates a portion of the error correction data and the videoconferencing server creates another portion of the error correction data.

13. The system of claim 9 wherein the error correction component sends an indication of a desired level of protection to the sending endpoint and receives error correction data from the sending endpoint based on the desired level of protection.

14. The system of claim 9 wherein the video conference data sending component periodically re-determines which of the packets of the error correction data to send to each receiving endpoint.

15. The system of claim 9 wherein a packet sent to the receiving endpoint comprises a format adaptation header that contains information about the presence and location of error correction data in a digital video bitstream.

16. The system of claim 9 wherein the error correction component determines whether error correction data should be produced for a particular video frame based on a type of the video frame.

17. The system of claim 9 wherein the error correction component produces error correction data based on statistics about a historical condition of the network.

18. The system of claim 9 wherein at least one receiving endpoint determines whether to use error correction data to recover one or more invalid packets based on information received from the videoconferencing server.

19. The system of claim 9 wherein the video conference data includes version information, such that a legacy client can interoperate with a newer videoconferencing server.

20. The system of claim 9 including a media transport packetizer that forms packets that include a header and a payload, wherein the header indicates to a receiving endpoint any dependency of the current frame on other frames in a video bitstream.

21. A computer-readable medium that is not a data transmission medium containing instructions for controlling a computer system to recover lost packets at a receiving endpoint, by a method comprising:
> receiving video data sent from a sending endpoint to a plurality of receiving endpoints, wherein the video data is divided into one or more data packets;
> receiving error correction data from the sending endpoint, wherein the error correction data is divided into first protection packets and second protection packets, the second protection packets providing a higher level of protection than the first protection packets;
> determining that a lost data packet sent by the sending endpoint was not received by the receiving endpoint;
> determining to use either the first protection packets or the second protection packets to recover data of the lost data packet based on characteristics of data packets of the video data;
> when it is determined to use the first protection packets, applying the error correction data from the first protection packets to recover the lost data packet; and
> when it is determined to use the second protection packets, applying the error correction data from the second protection packets to recover the lost data packet
>> wherein each receiving endpoint receives both the first protection packets and the second protection packets and selectively determines whether to use the first protection packets or the second protection packets.

22. The computer-readable medium of claim 21 including adding padding to a data packet based on information in a header of the data packet.

23. The computer-readable medium of claim 21 including periodically sending an indication of packet loss to the sending endpoint.

24. The computer-readable medium of claim 21 wherein determining that at least one data packet was not received comprises detecting a sequence number for each received data packet.

25. The computer-readable medium of claim 21 wherein each protection packet includes an indication of the level of protection provided by the error correction data in the protection packet.

* * * * *